(12) United States Patent
Huynh et al.

(10) Patent No.: US 7,795,761 B2
(45) Date of Patent: Sep. 14, 2010

(54) POWER CONVERTERS WITH SWITCHED CAPACITOR BUCK/BOOST

(75) Inventors: Steven Huynh, Fremont, CA (US); Matthew A. Grant, Palo Alto, CA (US); Lin Chen, Mountain View, CA (US)

(73) Assignee: Active-Semi, Inc. (VG)

( * ) Notice: Subject to any disclaimer, the term of this patent is extended or adjusted under 35 U.S.C. 154(b) by 161 days.

(21) Appl. No.: 12/317,223

(22) Filed: Dec. 19, 2008

(65) Prior Publication Data

US 2010/0156368 A1 Jun. 24, 2010

(51) Int. Cl.
*H01H 9/54* (2006.01)
(52) U.S. Cl. .................................... 307/140
(58) Field of Classification Search .............. 307/140
See application file for complete search history.

(56) References Cited

U.S. PATENT DOCUMENTS

| | | | |
|---|---|---|---|
| 4,578,630 A | 3/1986 | Grosch | |
| 5,402,060 A | 3/1995 | Erisman | |
| 5,528,125 A | 6/1996 | Marshall et al. | |
| 6,275,016 B1 | 5/2001 | Ivanov | |
| 6,522,558 B2 | 2/2003 | Henry | |
| 2008/0136367 A1* | 6/2008 | Adest et al. ............ | 320/103 |
| 2008/0239772 A1 | 10/2008 | Oraw et al. | |
| 2008/0303499 A1* | 12/2008 | Chen et al. ............ | 323/282 |

OTHER PUBLICATIONS

Texas Intruments, brochure, "High Efficient Single Inductor Buck-Boost Converter With 1.8-A Switches", pub. Jul. 2008, downloaded from Internet Oct. 22, 2008, http://focus.ti.com/docs/prod/folders/print/tps6300.html.
LTC3440—Micropower Synchronous Buck-Boost DC/DC Converter, downloaded from Internet Dec. 1, 2008, http://www.linear.com/pc/downloadDocument.do?navId=H0,C1,C1003,C1042,C116,P2123,D3314.

* cited by examiner

*Primary Examiner*—Robert L. Deberadinis
(74) *Attorney, Agent, or Firm*—Imperium Patent Works; T. Lester Wallace; Joseph S. Spano

(57) ABSTRACT

A power converter having a switched capacitor buck/boost operation has first and second switches coupled to a first switching node, third and fourth switches coupled to a second switching node, a capacitor coupled between the first and second switching nodes, and an inductor coupled to the first switching node. A switch controller controls the switches to operate in voltage step-down mode and voltage step-up mode depending on a difference between converter output voltage VOUT and converter input voltage VIN. In a buck-optimized topology operating in a step-down mode, an output current flowing through the first switching node flows through only one switch at a given time. In a boost-optimized topology operating in a step-up mode, an output current flowing through the first switching node flows through only one switch at a given time. As a result, a more compact and efficient power converter may be realized at lower cost.

34 Claims, 14 Drawing Sheets

POWER CONVERTER - BUCK-OPTIMIZED TOPOLOGY WITH SWITCHED CAPACITOR BOOST CAPABILITY

TYPICAL POWER REGULATION OF BATTERY-POWERED ELECTRONIC DEVICES

TYPICAL LI-ION BATTERY DISCHARGE CURVE, REGULATED SUPPLY VOLTAGE, AND POWER CONVERTER OPERATING REGIONS

POWER CONVERTER – BUCK-OPTIMIZED TOPOLOGY WITH SWITCHED
CAPACITOR BOOST CAPABILITY

POWER CONVERTER - BUCK-OPTIMIZED TOPOLOGY WITH SWITCHED CAPACITOR BOOST CAPABILITY

EFFICIENCY IMPROVEMENT USING BUCK-OPTIMIZED TOPOLOGY WITH SWITCHED CAPACITOR BOOST CAPABILITY

POWER CONVERTER - BOOST-OPTIMIZED TOPOLOGY WITH SWITCHED CAPACITOR BUCK CAPABILITY

POWER CONVERTER - BOOST-OPTIMIZED TOPOLOGY WITH SWITCHED CAPACITOR BUCK CAPABILITY

EFFICIENCY IMPROVEMENT USING BOOST-OPTIMIZED TOPOLOGY WITH SWITCHED CAPACITOR BUCK CAPABILITY

SWITCH CONTROLLER OPERATING IN AVERAGE CURRENT CONTROL MODE

RAMP OFFSET FUNCTION

PWM CIRCUIT OPERATION FOR BUCK-OPTIMIZED TOPOLOGY OPERATING IN STEP-DOWN MODE

PWM CIRCUIT OPERATION FOR BUCK-OPTIMIZED TOPOLOGY OPERATING IN COMBINATION MODE

PWM CIRCUIT OPERATION FOR BUCK-OPTIMIZED TOPOLOGY OPERATING IN STEP-UP MODE

OUTPUT CURRENT PATH DURING PORTION T2 OF THE SWITCHING CYCLE FOR THE BUCK-OPTIMIZED TOPOLOGY OPERATING IN STEP-DOWN MODE

OPERATING VOLTAGES FOR BUCK-OPTIMIZED TOPOLOGY OPERATING IN STEP-UP MODE

INDUCTOR CURRENT FOR BUCK-OPTIMIZED TOPOLOGY OPERATING IN STEP-UP MODE

POWER CONVERTERS WITH SWITCHED CAPACITOR BUCK/BOOST

TECHNICAL FIELD

The present disclosure relates generally to efficient power converters that are operable in both a voltage step-up mode and a voltage step-down mode, depending on a difference between an output voltage VOUT and an input voltage VIN.

BACKGROUND

For some applications, it is useful to have a single switched mode power converter available that may operate to supply an output voltage that is smaller than an input voltage and at different times to supply an output voltage that is greater than an input voltage. A common application example, illustrated in FIG. 1A, is when an input voltage source 100 such as a battery supplies an input voltage 111 to a power converter 180 which in turn supplies a constant output voltage 113 to an electronic circuit 200.

FIG. 1B illustrates the decay in battery voltage available from a typical Li-ion battery as a function of time. As illustrated in FIG. 1B, when the battery 100 is fully charged, the DC voltage supplied by the battery 100 is larger than the DC voltage required by the circuit 200 (3.3 volts in this example). The intervening power converter 180 therefore operates to "step-down" or "buck" the battery voltage to the voltage required by the circuit 200. A switched mode power supply operating in this manner is often termed a "buck converter". As the battery 100 discharges, however, the DC voltage supplied by the battery 100 decreases. At a certain point, the DC voltage supplied by the battery 100 is lower than the DC voltage required by the circuit 200. The intervening-power converter 180 then must operate to "step-up" or "boost" the battery voltage to the voltage required by the circuit 200. A switched mode power supply operating in this manner is often termed a "boost converter". A power supply that is capable of operating to both "buck" and "boost" may be referred to as a "buck-boost" converter. There are many known topologies for buck-boost converters.

For example, the TPS63000 family of buck-boost converters available from Texas Instruments Incorporated of Dallas, Tex. and the LTC3440 family of buck-boost converters available from Linear Technology Corporation of Milpitas, Calif. are representative of a conventional 4-switch topology. The basic topology of a conventional 4-switch power converter may employ a circuit involving an inductor and four switches. A first of the switches (S1) is coupled between an input voltage supply and a first terminal of the inductor. A second of the switches (S2) is coupled between the first terminal of the inductor and a ground node. A third of the switches (S3) is coupled between a second terminal of the inductor and the ground node. A fourth of the switches (S4) is coupled-between the second terminal of the inductor and a load.

In a buck mode, one of four switches is active, another switch is operating as a rectifier, another switch is permanently on, and the last switch is permanently off. In a boost mode, one switch is active, one switch is operating as a rectifier, one switch is permanently on, and one switch is permanently off. The converter automatically switches from step-down operation to step-up operation and back as required. In addition, there may be a four-switch buck-boost operating mode implemented when the input supply voltage is approximately the same as the output voltage. However, regardless of operating mode, there are two switches in series in the output current path-through a power converter of the conventional four-switch topology. Thus, to achieve the same efficiency as a power converter with one switch in the output current path, the switches of a conventional 4-switch topology have half the resistance. In an integrated circuit implementation this results in an increase of die area and cost.

Although the conventional 4-switch topology operates satisfactorily in many applications, improvements are desired.

SUMMARY

A novel power converter having a switched capacitor buck-boost operation has a first switch coupled between a first direct current (DC) voltage node and a first switching node, a second switch coupled between the first switching node and a second DC voltage node, a third switch coupled between a third DC voltage node and a second switching node, a fourth switch coupled between the second switching node and a fourth DC voltage node, a capacitor coupled between the first and second switching nodes, and a first lead of an inductor coupled to the first switching node. A switch controller controls the switches such that the converter operates in a voltage step-down mode or a voltage step-up mode depending on the difference between the converter output voltage VOUT and the converter input voltage VIN.

In one novel aspect, a buck-optimized topology of the novel power converter is realized. An input voltage source is connected to the first DC voltage node to supply VIN. A first lead of an output capacitor is connected to an electrical ground. A second lead of the output capacitor is connected to a second lead of the inductor at an output voltage node. VOUT is carried on the output voltage node. Furthermore, a return voltage source is connected to the second DC voltage node, a third input voltage source is connected to the third DC voltage node, and a fourth input voltage source is connected to the fourth DC voltage node. In this buck-optimized topology operating in a step-down mode, an output current flowing through the first switching node flows through only one switch at a given time. As a result, a more compact and efficient power converter may be realized at lower cost.

In a second novel aspect, another buck-optimized topology is realized. A first switch is coupled between a first direct current (DC) voltage node and a first switching node, a second switch is coupled between the first switching node and a second DC voltage node, a third switch coupled between the first DC voltage node and a second switching node, a fourth switch is coupled between the second switching node and the second DC voltage node, and a switch controller controls the first, second, third, and fourth switches, wherein the apparatus is operable in a voltage step-down mode and a voltage step-up mode, and wherein during operation in the voltage step-down mode an output current flowing through the first switching node flows through no more than one of the first, second, third and fourth switches at a given time.

In a third novel aspect, a boost-optimized topology of the novel power converter is realized. An input voltage source is connected to a second lead of the inductor to supply VIN. A first lead of an output capacitor is connected to an electrical ground. A second lead of the output capacitor is connected to the first DC voltage node at an output voltage node. VOUT is carried on the output voltage node. Furthermore, a return voltage source is connected to the second DC voltage node, a third input voltage source is connected to the third DC voltage node, and a fourth input voltage source is connected to the fourth DC voltage node. In this boost-optimized topology operating in a step-up mode, an output current flowing through the first switching node flows through only one switch at a given time. As a result, a more compact and efficient power converter may be realized at lower cost.

In a fourth novel aspect, another boost-optimized topology of the novel power converter is realized. An input voltage source is connected to a second lead of the inductor to supply VIN. A first lead of an output capacitor is connected to an electrical ground. A second lead of the output capacitor is connected to the first and third DC voltage nodes at an output voltage node. VOUT is carried on the output voltage node. Furthermore, a return voltage source is connected to the second and fourth DC voltage nodes. In this boost-optimized topology operating in a step-up mode, an output current flowing through the first switching node flows through only one switch at a given time. As a result, a more compact and efficient power converter may be realized at lower cost.

The novel power converter with switched capacitor buck/boost may controlled by the switch controller operating in an average current control mode. Furthermore, the power converter may operate in a step-down mode, a step-up mode, and a combination mode. The mode in which the converter operates is determined by the difference between VOUT and VIN. In one operational example, if VOUT is substantially less than VIN then the converter operates in a step-down mode, whereas if VOUT is substantially greater than VIN then the converter operates in a step-up mode, and whereas if VOUT is substantially similar to VIN then the converter operates in a combination mode. The novel power converter can also be programmed to operate in a selectable one of other ways. For example, the converter can be programmed so that there is no combination, but rather the converter operates either in step-down or step-up mode depending on the difference between VOUT and VIN. The converter can also be user programmed so that the converter always operates in a combination mode regardless of the difference between VOUT and VIN such that the converter has no step-up or step-down mode.

In one embodiment, the converter is programmed by setting a DC voltage offset between two internally generated ramp signals and by setting an associated error voltage limiting circuit. The DC voltage offset is a function of the difference VOUT-VIN and this function can be changed within the converter. A ramp generator sets the DC voltage offset depending on the current magnitude of VOUT-VIN in accordance with the selected function. The ramp generator also sets the associated error voltage limiting circuit so that the overall converter operates properly.

In one example, the novel converter is realized as a power converter tile. The tile is of an architecture that facilitates the rapid integration of the tile into a larger Chip Scale Package (CSP) integrated circuit involving other tiles.

Other structures and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1A:
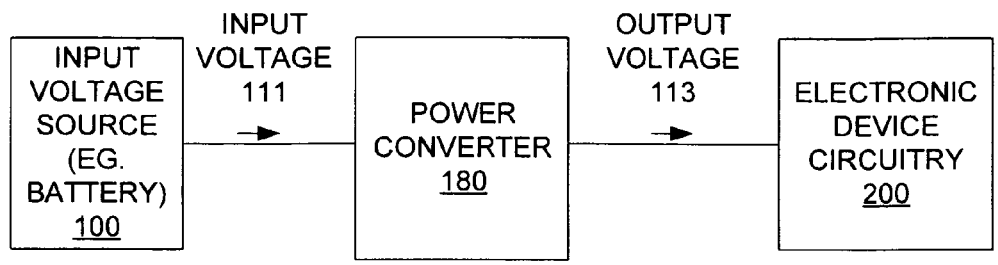
FIGS. 1A and 1B are diagrams illustrative of a function of a power converter in supplying constant voltage to battery powered electronic devices and a typical Li-ion battery discharge curve.
Figure 1B:
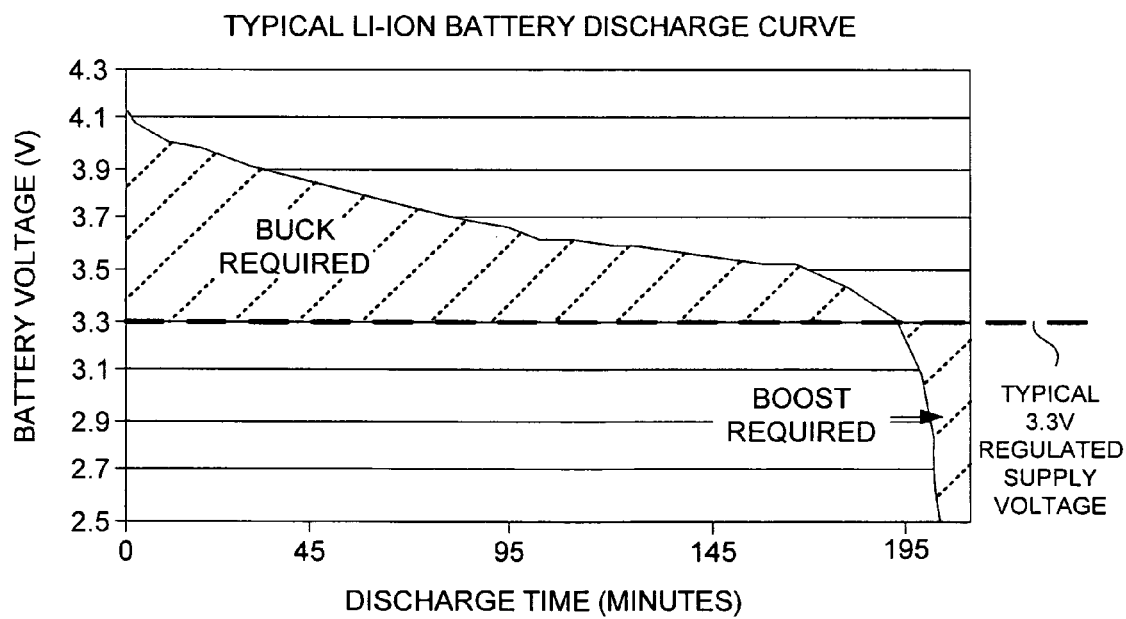
Figure 2:
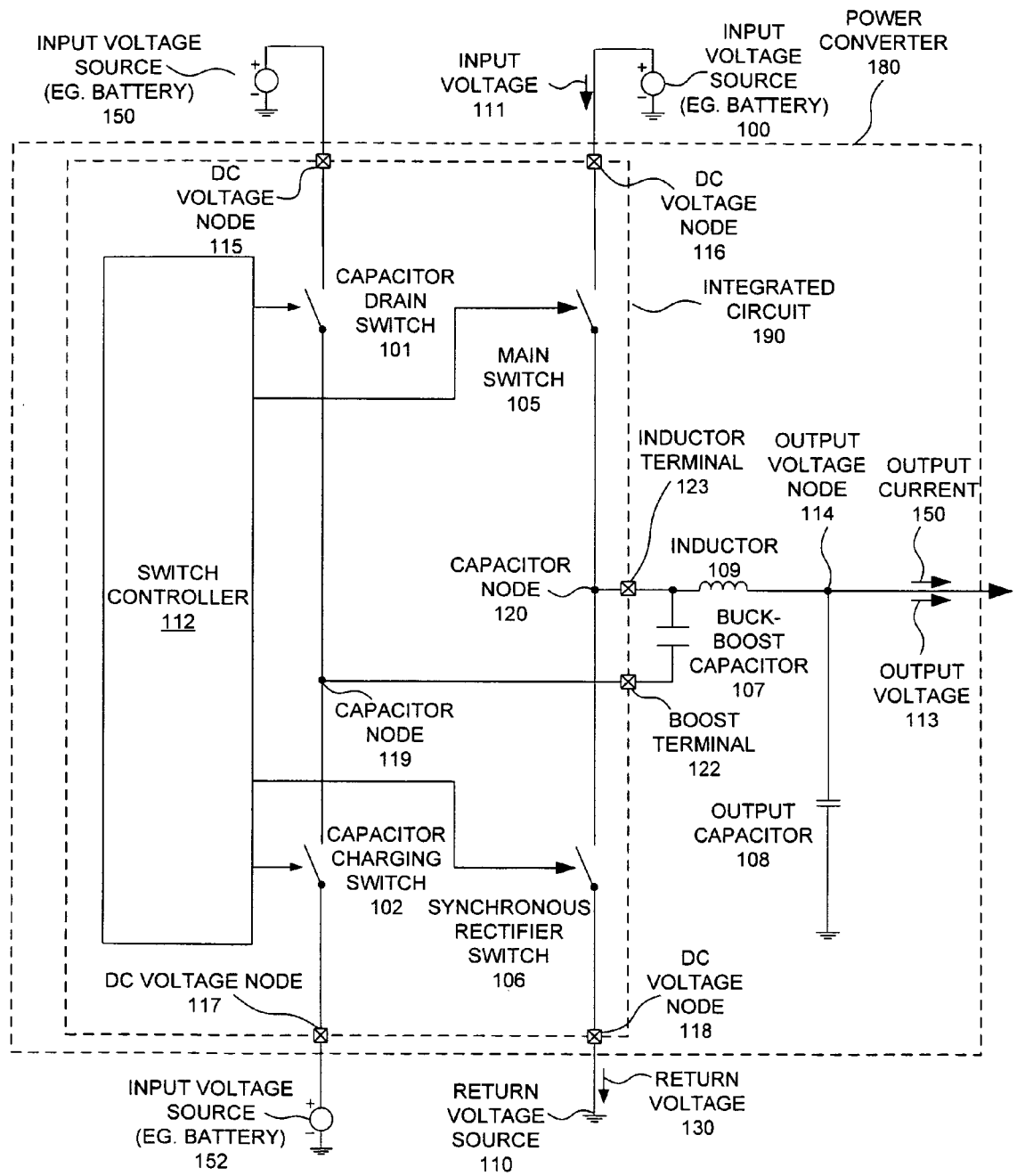
FIG. 2 is a diagram illustrative of a first embodiment of a novel power converter in a buck-optimized topology with a switched capacitor boost capability.

FIG. 2 is a diagram of a first embodiment of a novel power converter 180 configured in a buck-optimized topology with a switched capacitor boost capability. As such, power converter 180 is configured to step-down voltage with high efficiency, but to have the capability to step-up voltage when necessary. Power converter 180 includes a main switch 105 coupled to a first DC voltage node 116 and a first capacitor node 120, a synchronous rectifier switch 106 coupled to a second DC voltage node 118 and the first capacitor node 120, a capacitor drain switch 101 coupled to a third DC voltage node 115 and a second capacitor node 119, a capacitor charging switch 102 coupled to a fourth DC voltage node 117 and the second capacitor node 119, a switch controller 112, a buck-boost capacitor 107 coupled to first capacitor node 120 and second capacitor node 119, an inductor 109 coupled to first capacitor node 120 and an output voltage node 114, and an output capacitor 108 coupled to output voltage node 114 and a source of electrical ground such as return voltage source 110. A first input voltage source 100 is coupled to DC voltage node 116 and supplies an input voltage 111 to the power converter 180. A second input voltage source 150 is coupled to DC voltage node 115 and a third input voltage source 152 is coupled to DC voltage node 117. In addition, a return voltage source 110 receiving return voltage 130 is coupled to DC voltage node 118. Power converter 180 operates to deliver an output current 150 of constant output voltage 113 present on output voltage node 114 from an input voltage 111 that may be significantly higher or lower than output voltage 113.

Figure 3:
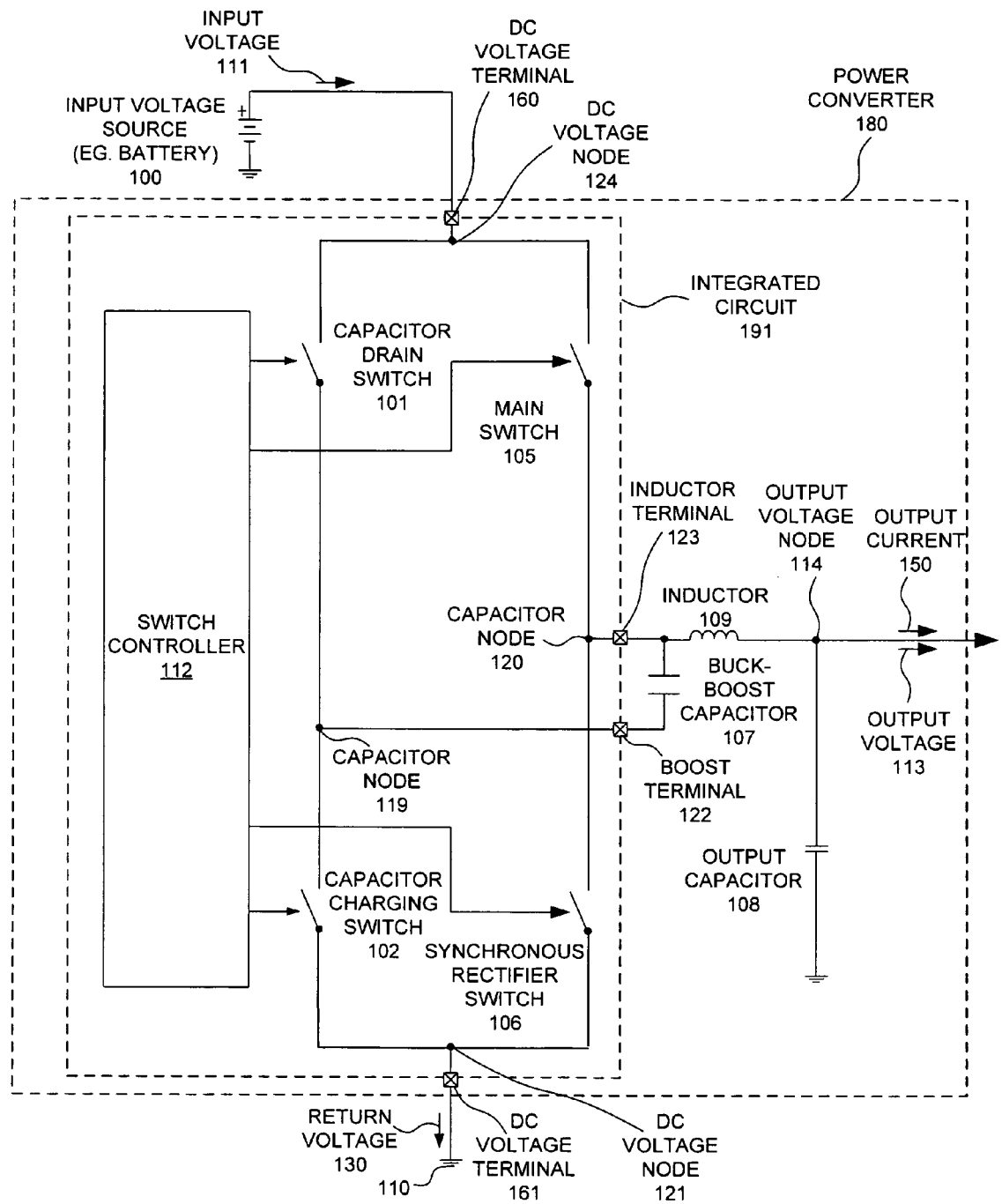
FIG. 3 is a diagram illustrative of a second embodiment of a novel power converter in a buck-optimized topology with a switched capacitor boost capability.

FIG. 3 illustrates a second embodiment of novel power converter 180 configured in a buck-optimized topology with a switched capacitor boost capability. The second embodiment is analogous to the first embodiment with the following differences. In this particular configuration DC voltage nodes 115 and 116 are collapsed into a single DC voltage node 124 that is coupled to input voltage source 100. Furthermore, DC voltage nodes 117 and 118 are collapsed into a single DC voltage node 121 that is coupled to return voltage source 110. Similarly, in this embodiment power converter 180 operates to deliver an output current 150 of constant output voltage 113 present on output voltage node 114 from an input voltage 111 that may be significantly higher or lower than output voltage 113.

Figure 4A:
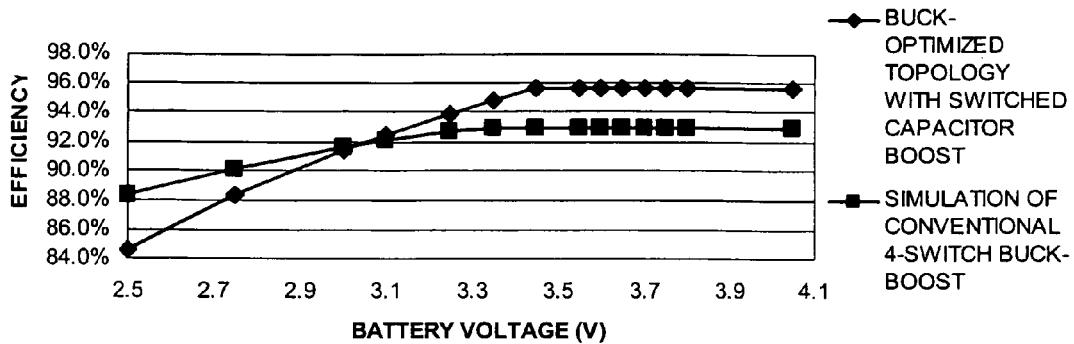
FIGS. 4A and 4B are diagrams illustrative of simulation results indicative of the relative electrical efficiency of the novel power converter in a buck-optimized topology compared to a conventional 4-switch buck-boost converter.
Figure 4B:
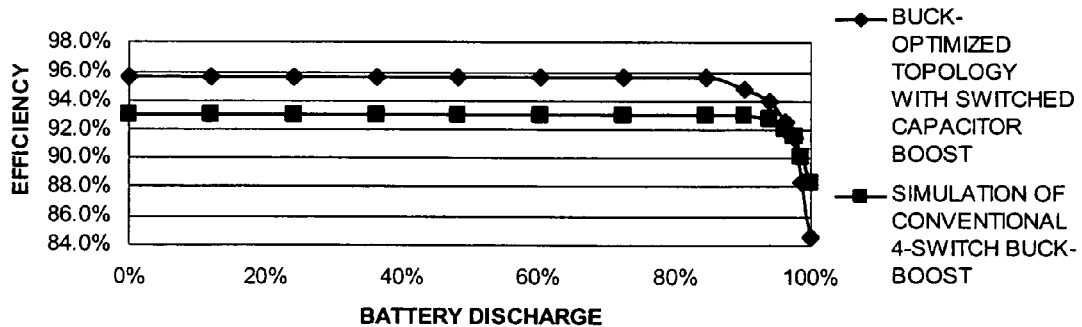

FIGS. 4A and 4B illustrate a potential benefit of the first and second embodiments of novel power converter 180 that feature a buck-optimized topology with a switched capacitor boost capability. A simulation of the efficiency of this topology is compared with a simulation of the efficiency of a conventional 4-switch buck-boost converter of the same power capacity. Each simulated converter supplies an identical average current of 1 ampere at 3.3 volts from a typical Li-ion battery. The simulation assumes a 0.1 ohm FET for each of the four switches of the conventional 4-switch buck-boost converter. The simulation further assumes a 0.1 ohm FET for main switch 105 and synchronous rectifier switch 106, a 0.5 ohm FET for the capacitor drain switch 101, and a 0.3 ohm FET for the capacitor charging switch 102. The use of higher resistance FETs for power converter 180 may enable a smaller die size and reduced cost in an integrated circuit implementation. FIG. 4A illustrates simulation results that indicate that when battery voltage falls below approximately 3.1 volts the efficiency of the 4-switch buck-boost converter exceeds that of the buck-optimized topology of power converter 180. However, the opposite is true when battery voltage exceeds approximately 3.1 volts. Thus, in general, the buck-optimized topology of power converter 180 can step-down voltage more efficiently than a comparable conventional 4-switch buck-boost converter. But, when it is necessary to step-up voltage the buck-optimized topology with switched capacitor boost is generally less efficient than a comparable conventional 4-switch buck-boost converter.

FIG. 4B compares the efficiency of each converter over a complete discharge cycle of a typical Li-ion battery supplying the same average current of 1 ampere at 3.3 volts. FIG. 4B illustrates that the buck-optimized topology of power converter 180 is more efficient than a conventional 4-switch buck-boost converter for over ninety-five percent of the discharge cycle of a battery despite the simulated use of higher resistance FETs for two switches. This advantage can be understood because in the underlying simulation the output voltage of the typical battery is higher than the voltage required by the electronic circuit for most of the discharge cycle. Thus, in this simulated operational scenario the overall power converter efficiency of the buck-optimized topology with switched capacitor boost exceeds that of a comparable conventional 4-switch buck-boost converter.

Figure 5:
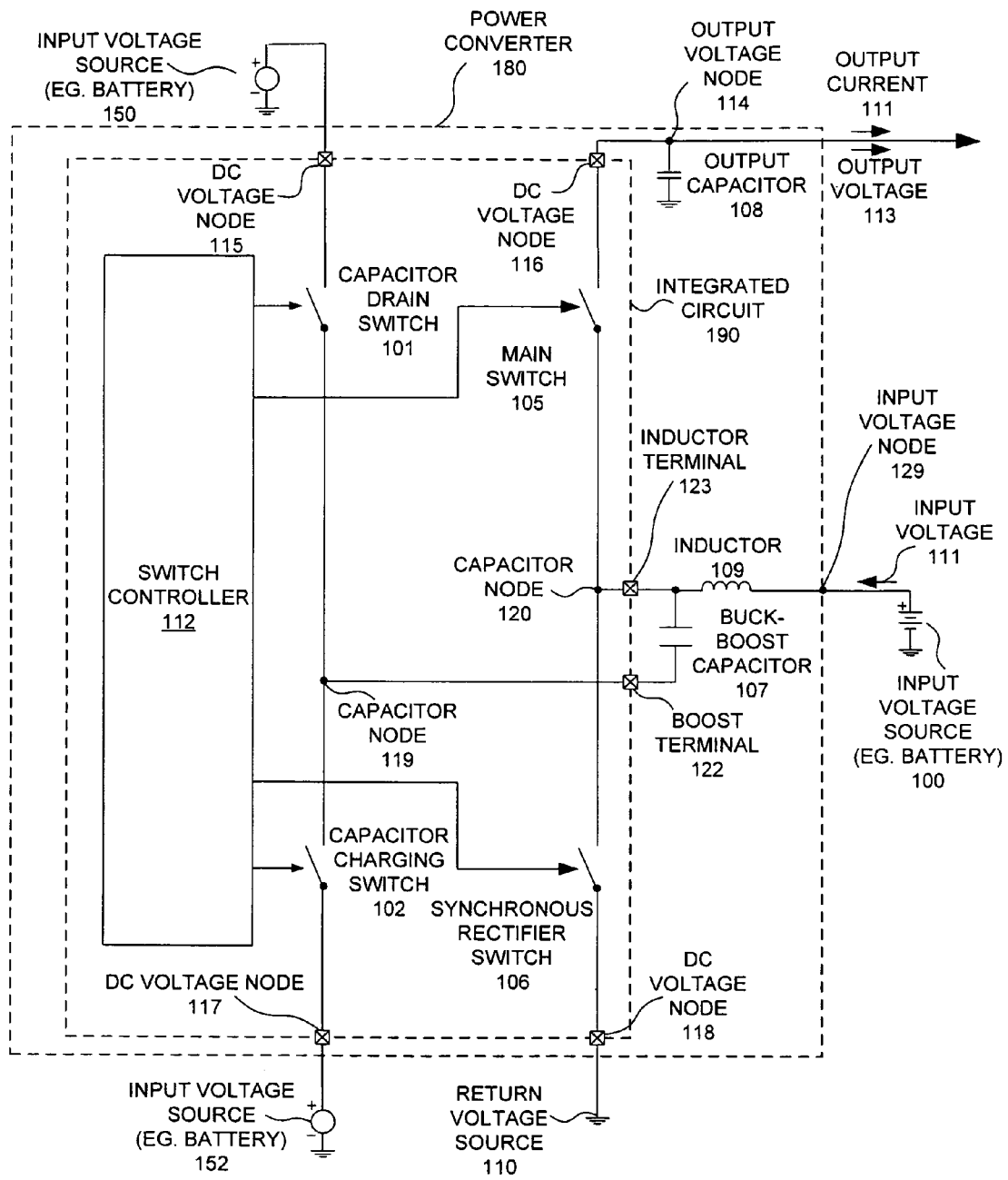
FIG. 5 is a diagram illustrative of a third embodiment of a novel power converter in a boost-optimized topology with a switched capacitor buck capability.

FIG. 5 illustrates a third embodiment of novel power converter 180 configured in a boost-optimized topology with a switched capacitor buck capability. This particular configuration is analogous to the first embodiment of power converter 180 illustrated in FIG. 2 except that input voltage source 100 supplying input voltage 111 is coupled to inductor 109 and output capacitor 108 coupled to output voltage node 114 is coupled to DC voltage node 116. In this embodiment power converter 180 again operates to deliver an output current 150 of constant output voltage 113 present on output voltage node 114 from an input voltage 111 that may be significantly higher or lower than output voltage 113.

Figure 6:
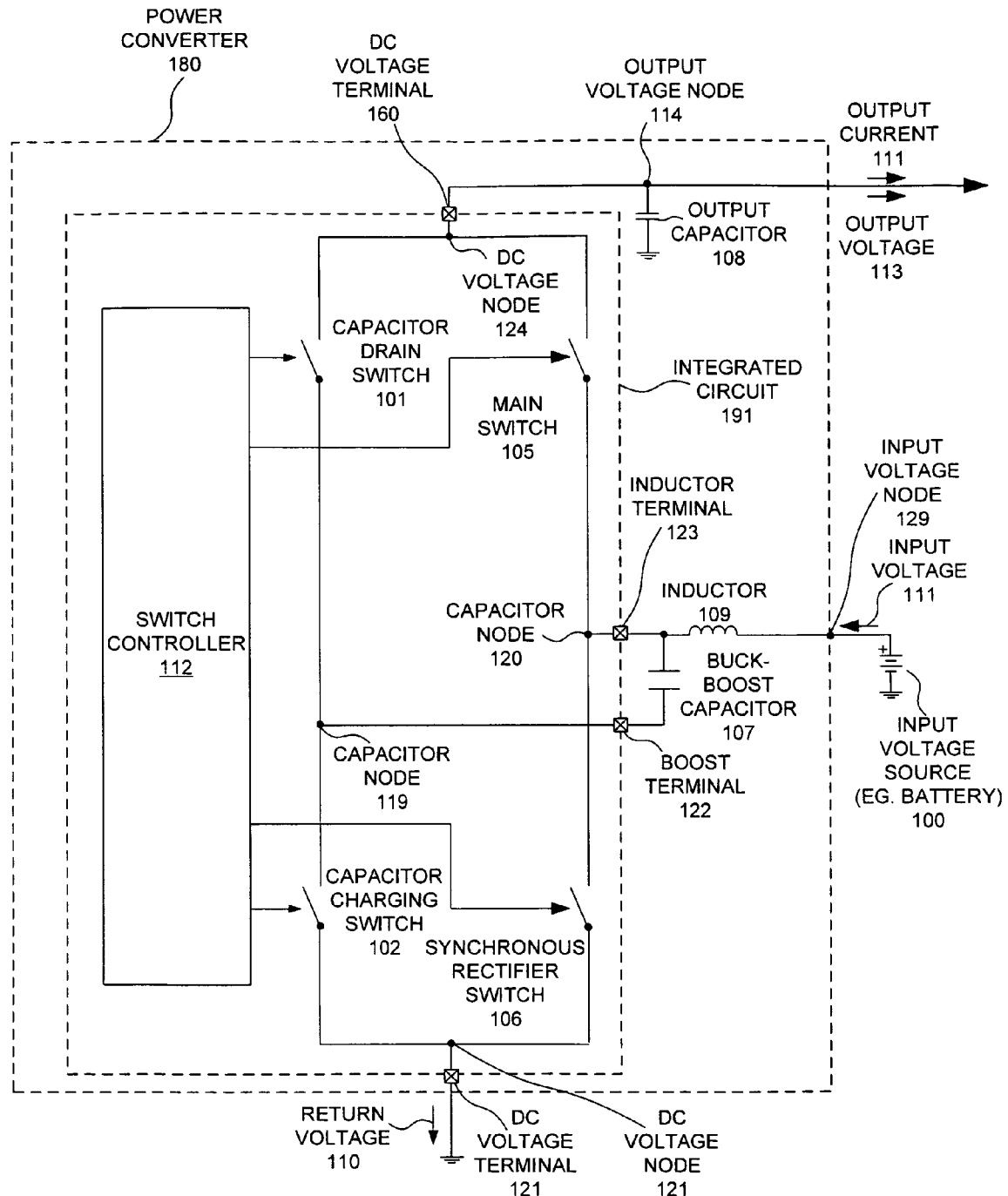
FIG. 6 is a diagram illustrative of a fourth embodiment of a novel power converter in a boost-optimized topology with a switched capacitor buck capability.

FIG. 6 illustrates a fourth embodiment of novel power converter 180 configured in a boost-optimized topology with a switched capacitor buck capability. This particular configuration is analogous to the second embodiment of power converter 180 illustrated in FIG. 3 except that input voltage source 100 supplying input voltage 111 is coupled to inductor 109 at input voltage node 129 and output capacitor 108 coupled to output voltage node 114 is coupled to DC voltage node 124. In this embodiment power converter 180 again operates to deliver an output current 150 of constant output voltage 113 present on output voltage node 114 from an input voltage 111 that may be significantly higher or lower than output voltage 113.

Figure 7A:
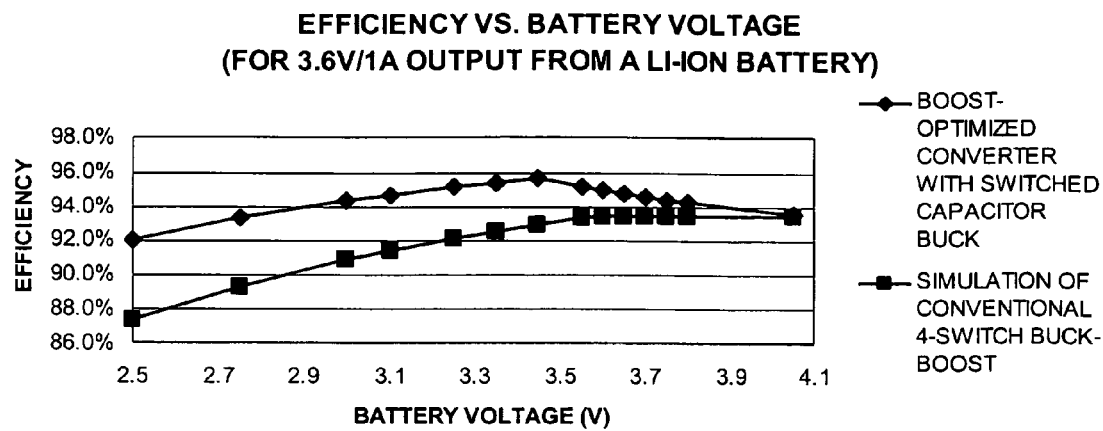
FIGS. 7A and 7B are diagrams illustrative of simulation results indicative of the relative electrical efficiency of the novel power converter in a boost-optimized topology compared to a conventional 4-switch buck-boost converter.
Figure 7B:
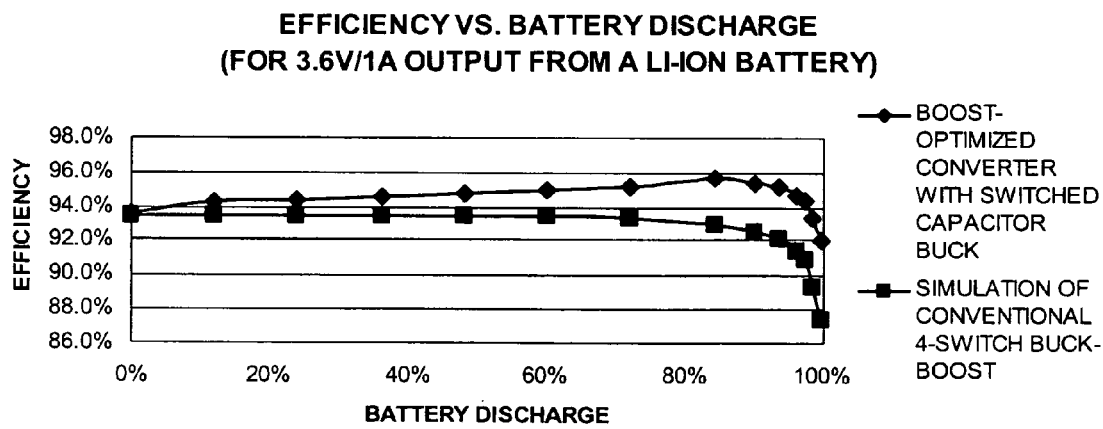

FIGS. 7A and 7B illustrate a potential benefit of the third and fourth embodiments of power converter 180. Both embodiments feature a boost-optimized topology with switched capacitor buck capability. A simulation of the efficiency of this topology is compared with a simulation of the efficiency of a conventional 4-switch buck-boost converter of the same power capacity. Each simulated converter supplies an identical average current of 1 A at 3.6V from a typical Li-ion battery. The simulation assumes a 0.1 ohm FET for each of the four switches of the conventional 4-switch buck-boost converter. The simulation further assumes a 0.1 ohm FET for main switch 105 and synchronous rectifier switch 106, a 0.5 ohm FET for the capacitor drain switch 101, and a 0.3 ohm FET for the capacitor charging switch 102. The use of higher resistance FETs for power converter 180 may enable a smaller die size and reduced cost in an integrated circuit implementation. FIG. 7A illustrates that under these conditions the boost-optimized topology of power converter 180 operates more efficiently than a comparable 4-switch buck-boost converter over a 2.5V-4V range of battery voltages. Thus, in general, the boost-optimized topology of power converter 180 can step-up voltage more efficiently than a comparable conventional 4-switch buck-boost converter over the typical operating range of a typical Li-ion battery.

FIG. 7B compares the efficiency of each converter over a complete discharge cycle of a typical Li-ion battery supplying the same average current of 1 A at 3.6V. FIG. 7B illustrates that the boost-optimized topology of power converter 180 is more efficient than a conventional 4-switch buck-boost converter for approximately all of the typical discharge cycle of a typical Li-ion battery supplying 1 A average current at 3.6V despite the simulated use of higher resistance FETs for two switches. Thus, in this simulated operational scenario the overall power converter efficiency of the boost-optimized topology with switched capacitor buck exceeds that of a comparable conventional 4-switch buck-boost converter.

Each of the above-described embodiments of power converter 180 may be implemented as an integrated circuit form in whole or in part. For example, FIG. 2 and FIG. 5 illustrate a power converter integrated circuit 190 implemented as a part of power converter 180 in both the first and third embodiments. In these particular embodiments DC voltage node 115, DC voltage node 116, DC voltage node 117, and DC voltage node 118 are implemented as and include terminals of integrated circuit 190. In addition, capacitor node 119 is implemented as and includes boost terminal 122, and capacitor node 120 is implemented as and includes inductor terminal 123 of integrated circuit 190. In another example, FIG. 3 and FIG. 6 illustrate a power converter integrated circuit 191 implemented as a part of power converter 180 in both the second and fourth embodiments. In these particular embodiments DC voltage node 124 is implemented as and includes DC voltage terminal 160, DC voltage node 121 is implemented as and includes DC voltage terminal 161, capacitor node 119 is implemented as and includes boost terminal 122, and capacitor node 120 is implemented as and includes inductor terminal 123 of integrated circuit 191.

Furthermore, each of the capacitor drain switch 101, capacitor charging switch 102, main switch 105, and synchronous rectifier switch 106 as a switching element of each of the above-described embodiments may be implemented as elements of an integrated circuit such as integrated circuit 190 and 191 or external to an integrated circuit. In addition, each of the capacitor drain switch 101, capacitor charging switch 102, main switch 105, and synchronous rectifier switch 106 as a switching element of each of the above-described embodiments may be implemented as a transistor, or alternatively, as a diode.

The buck-boost capacitor 107 as an element of each of the above-described embodiments may be implemented as an element of an integrated circuit or external to an integrated circuit such as integrated circuit 190 and 191. A typical selection for buck-boost capacitor 107 is approximately 0.1 microfarad-10 microfarad per 1 ampere average output current. Capacitor values scale linearly with increasing average output current requirements.

The inductor 109 as an element of each of the above-described embodiments may be implemented as an element of an integrated circuit or external to an integrated circuit such as integrated circuit 190 and 191. Although, for higher power applications, it is preferred to implement inductor 109 off-chip to decrease cost.

Output capacitor 108 as an element of each of the above-described embodiments may be implemented as an element of an integrated circuit or external to an integrated circuit such as integrated circuit 190 and 191.

Figure 8:
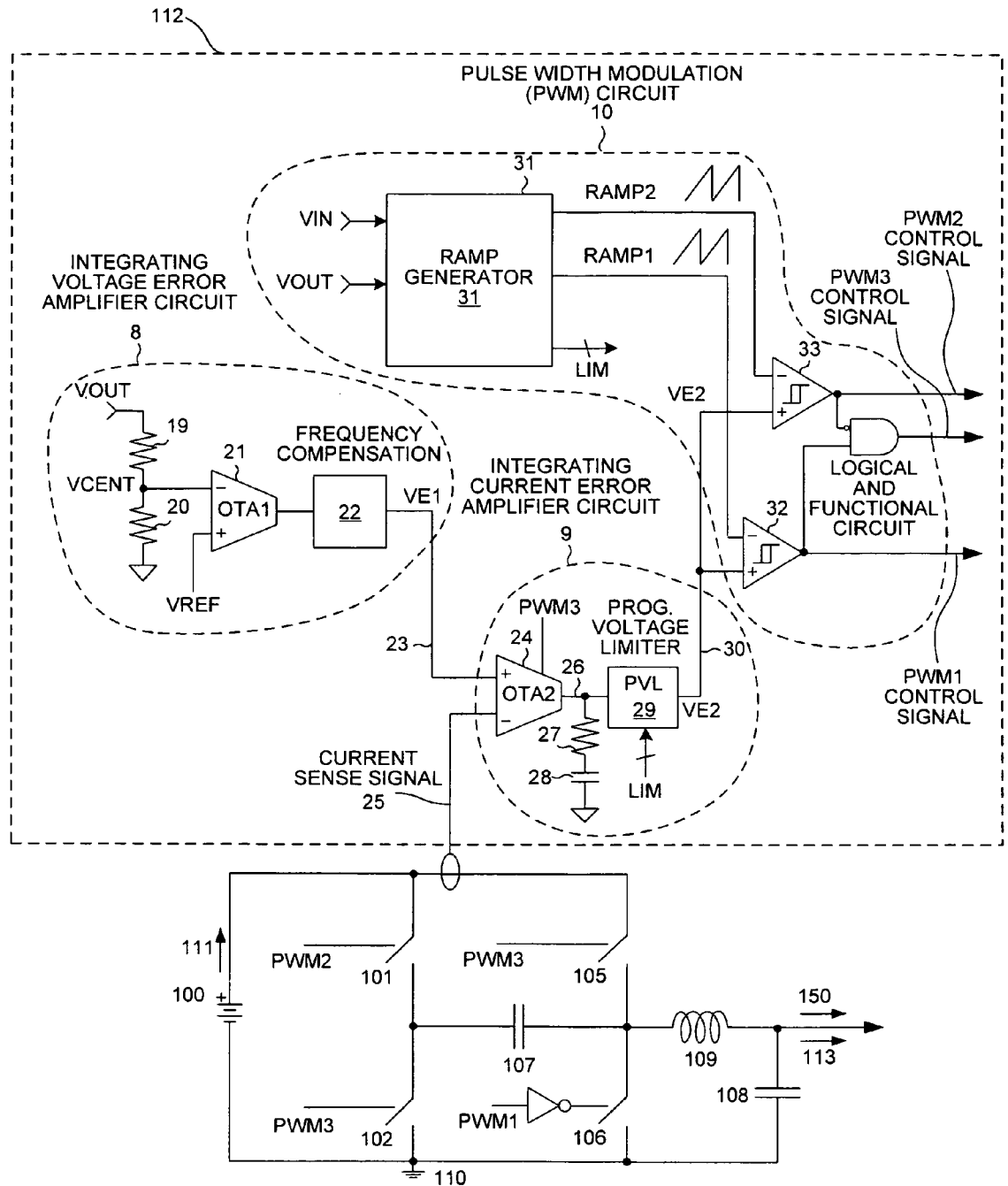
FIG. 8 is a block diagram of the second embodiment of a novel power converter with a switch controller configured to operate in an average current control mode.

FIG. 8 is a diagram of the second embodiment of power converter 180 in accordance with another novel aspect. FIG. 8 is illustrative of the operation of switch controller 112 operating in an average current control mode. This particular embodiment of switch controller 112 may be applied to any of the above-described embodiments of power converter 180. The operation of switch controller 112 within the second embodiment of power converter 180 is described in detail below for illustrative purposes.

In one embodiment, illustrated in FIG. 8, switch controller 112 is composed of an integrating voltage error amplifier circuit 8, an integrating current error amplifier circuit 9, a pulse width modulation circuit 10, and a current sense signal 25.

Integrating voltage error amplifier circuit 8 receives the output voltage (VOUT) 113 on output voltage node 114, voltage divides VOUT using a voltage divider involving resistors 19 and 20 thereby generating a centertap voltage VCENT proportional to VOUT. A first operational transconductance amplifier (OTA1) 21 compares VCENT to a reference voltage (VREF) and outputs a current signal whose magnitude is indicative of the voltage difference between VCENT and VREF. The current signal output by OTA1 21 is frequency compensated by block 22. Block 22 may, for example, be an analog low pass filter involving a capacitor and a resistor. The resulting voltage signal VE1 is a first error signal that is output onto node 23. VE1 is indicative of an error between VOUT and a desired value of VOUT.

A second operational transconductance amplifier (OTA2) 24 of integrating current error amplifier circuit 9 compares a current sense signal (VCS) on node 25 to the first error voltage VE1 on node 23. Voltage VCS is indicative of the magnitude of a current flow through at least one switching element. For example, VCS may be a measure of current flow through main switch 105. In this example, the measure of current flow through main switch 105 is only valid when main switch 105 is ON. Thus the pulse width modulation signal (PWM3), which controls the state of main switch 105, also acts to disable OTA2 when main switch 105 is OFF and to enable OTA2 when main switch 105 is ON. In another embodiment, a switch controlled by PWM3 and located at the output of OTA2 could achieve the same result.

The resulting current error signal on node 26 is integrated by an RC circuit involving resistor 27 and capacitor 28. The integrated signal passes through a programmable voltage limiter (PVL) 29 and is output onto node 30 as a second error voltage signal VE2. The integrating current error amplifier circuit 9 therefore integrates, over several switching cycles, the difference between the required current (as determined by VE1) and the current sensed (as determined by VCS). VE2 sets the average current flowing through main switch 105 in each switching cycle.

The voltage to which PVL 29 limits VE2 is set by ramp generator 31. For example, in a first setting PVL 29 allows VE2 to range from zero volts to a maximum of 1.0 volt, whereas in a second setting PVL 29 allows VE2 to range from zero volts to a maximum of 1.5 volts. Ramp generator 31 controls PVL 29 in accordance with the selected offset voltage to VOUT-VIN function, as described in further detail below.

Pulse width modulation circuit 10 includes ramp generator 31. Ramp generator 31 receives the input voltage (VIN) 111 and the output voltage VOUT 113. Ramp generator 31 uses the input voltage VIN and the output voltage VOUT to generate a first ramp voltage signal RAMP1 and a second ramp voltage signal RAMP2 such that a programmable DC offset voltage exists between the two ramp signals. A first comparator with hysteresis 32 compares the second error voltage VE2 with the first ramp signal RAMP1. The signal output by first comparator 32 is a first pulse width modulation control signal PWM1. The inverse of PWM1 controls the switching of synchronous rectifier switch 106 as illustrated. If PWM1 is high, then synchronous rectifier switch 106 is OFF. Otherwise, if PWM1 is low, then synchronous rectifier switch 106 is ON. A second comparator with hysteresis 33 compares the second error voltage VE2 with the second ramp signal RAMP2 to output a second pulse width modulation control signal PWM2. PWM2 controls the switching of capacitor drain switch 101 as illustrated. If PWM2 is high, then capacitor drain switch 101 is ON. Otherwise, if PWM2 is low, then capacitor drain switch 101 is OFF. A logical AND functional circuit receives PWM1 and the inverse of PWM2 and outputs a third pulse width modulation control signal PWM3. The logical AND functional circuit processes PWM1 and the inverse of PWM2 as would a conventional digital AND-gate to generate PWM3. The logical AND functional circuit may be implemented as digital logic. The logical AND functional circuit may also be implemented as analog circuit components that approximate the operation of a digital AND-gate. PWM3 controls the switching of main switch 105 and capacitor charging switch 102 as illustrated. If PWM 3 is high, then main switch 105 and capacitor charging switch 102 are ON.

Otherwise, if PWM3 is low, then main switch 105 and capacitor charging switch 102 are OFF.

Figure 9:
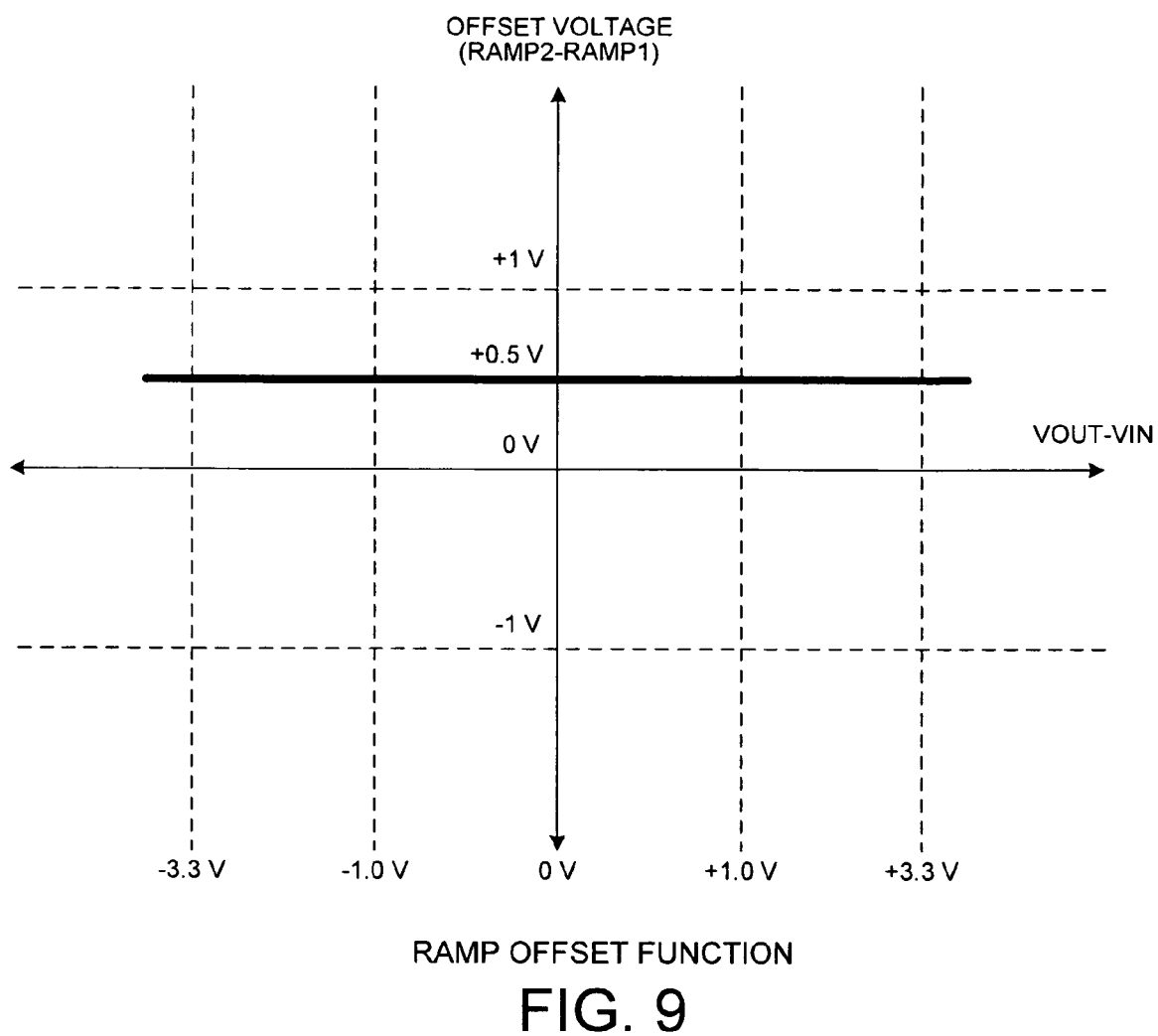
FIG. 9 is a diagram that shows an offset voltage to VOUT-VIN function that can be employed by the converter of FIG. 8.

Ramp generator 31 changes the offset voltage between the two ramp signals RAMP1 and RAMP2 as a programmable function of VIN and VOUT. FIG. 9 illustrates a constant offset voltage to (VOUT-VIN) function. As illustrated in FIG. 9, if VOUT-VIN is in the range of from −3.3 volts to +3.3 volts, then the offset voltage is +0.5 volts. The particular function selected at a given time may depend on programming data values loaded into ramp generator 31.

Figure 10A:
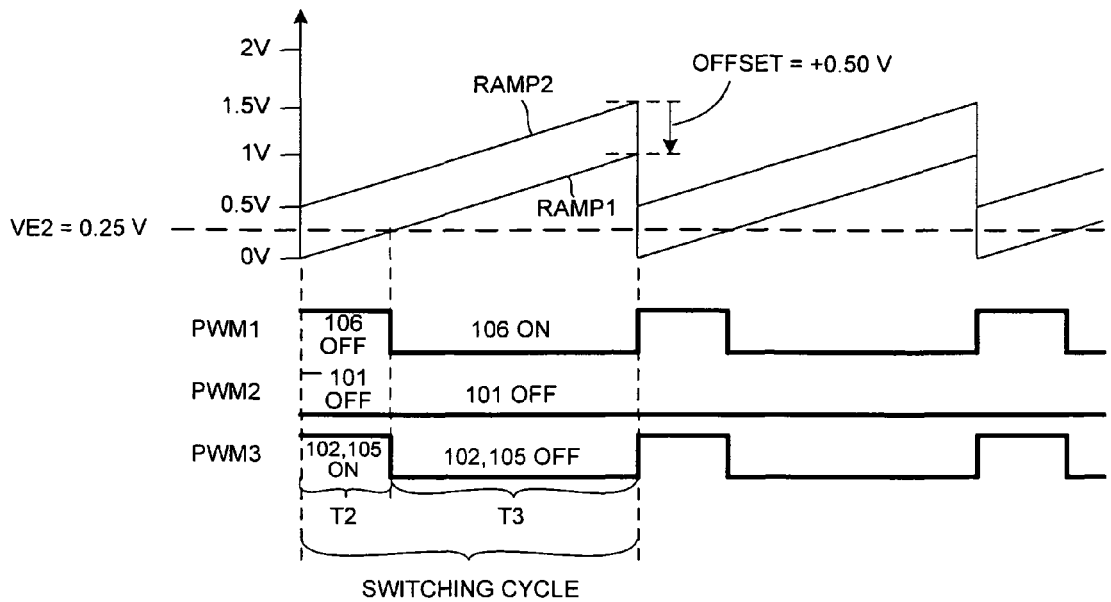
FIGS. 10A-10C are waveform diagrams that show operation of the converter of FIG. 8 when the function of FIG. 9 is employed.
Figure 10B:
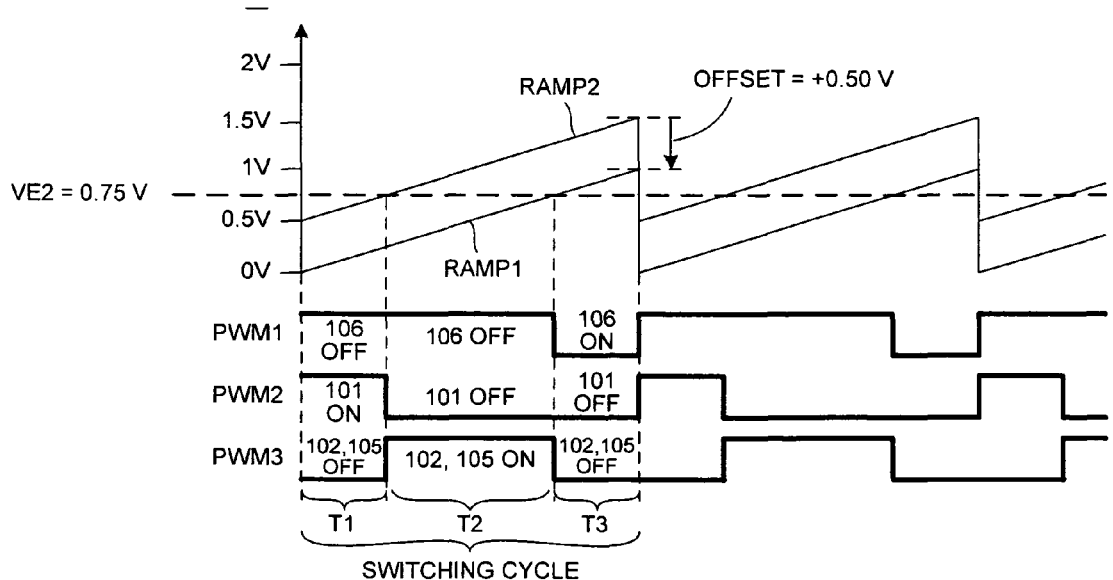
Figure 10C:
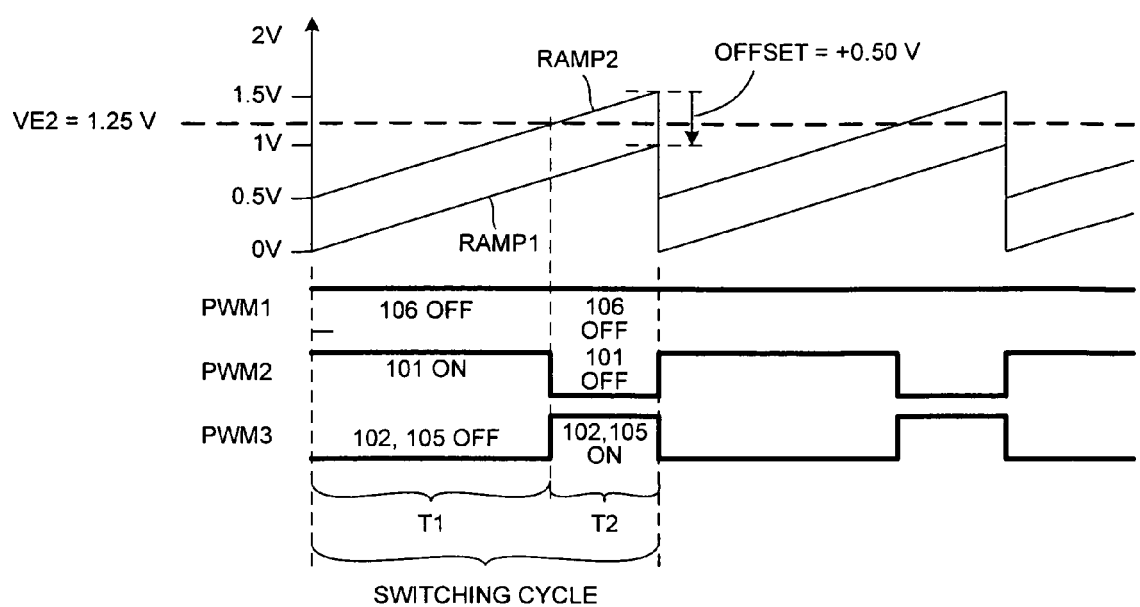

FIGS. 10A-10C illustrate one possible operation of the second embodiment of power converter 180 in accordance with the switch controller 112 of FIG. 8 operating in an average current control mode.

Figure 11:
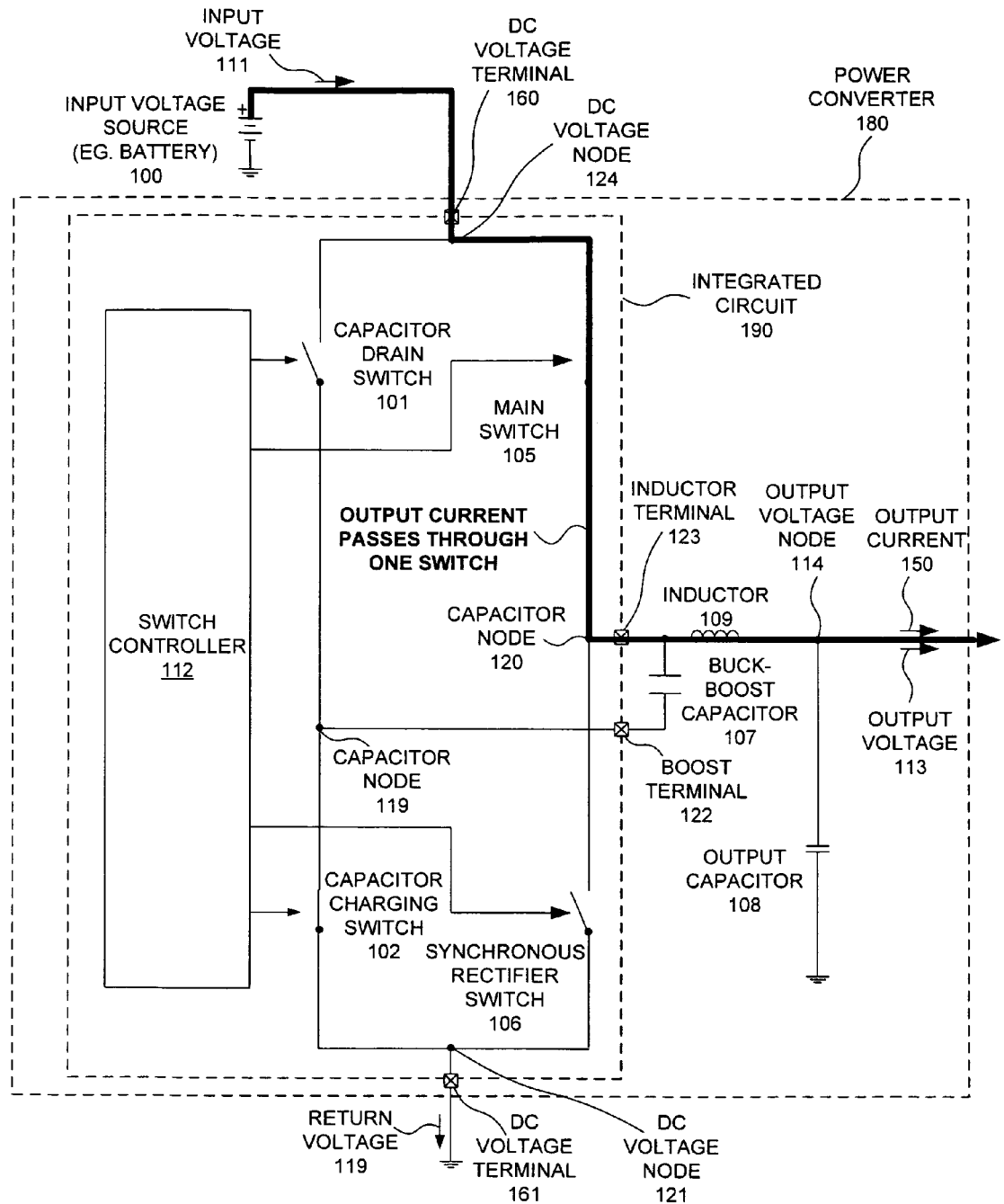
FIG. 11 is a diagram illustrative of a current path through the second embodiment of a novel power converter in a buck-optimized topology operating during portion T2 of the switching cycle of the step-down mode of FIG. 10A.

FIG. 10A illustrates a step-down mode of operation exhibited in this example when VE2 is +0.25 volts. Throughout the switching cycle illustrated in FIG. 10A, signal RAMP2, although it is ramping up and then returning back down, is always greater than VE2. Comparator 33 therefore always outputs PWM2 to have a low value due to the way that the inputs of comparator 33 are connected. This is indicated by the PWM2 waveform in FIG. 10A. Capacitor drain switch 101 is therefore always OFF. The RAMP1 signal, however, crosses VE2 as indicated in FIG. 10A. When RAMP1 is lower than VE2 for a portion of a switching cycle T2, then comparator 32 outputs PWM1 to have a high value due to the way that the inputs of comparator 32 are connected. When RAMP1 is higher than VE2 for a portion of a switching cycle T3, then comparator 32 outputs PWM1 to have a low value. This is indicated by the PWM1 waveform in FIG. 10A. Therefore, synchronous rectifier switch 106 is OFF for T2 and ON for T3. PWM1 and the inverse of PWM2 are received by the logical AND functional circuit, which outputs PWM3 to have a high value for T2 and a low value for T3. Therefore, main switch 105 and capacitor charging switch 102 are ON for T2 and OFF for T3. For the control scenario illustrated in FIG. 10A, the capacitor drain switch 101 is always OFF, so the buck-boost capacitor does not contribute energy to inductor 109 when main switch 105 is ON. As illustrated in FIG. 11, output current 150 flowing through inductor terminal 123 passes through main switch 105 alone. Thus, while main switch 105 is ON for T2 the instantaneous current of inductor 109 ramps up and while synchronous rectifier switch 106 is ON for T3 the instantaneous current of inductor 109 ramps down. In this step-down mode, the amount of voltage step-down is governed by the relative magnitudes of T2 and T3 in each switching cycle. In other embodiments of the step-down mode, capacitor charging switch 102 may be OFF for the entire switching cycle without changing the operation of the first and second embodiments of power converter 180.

FIG. 10B illustrates a combination mode of operation exhibited in this example when VE2 is +0.75 volts. In this mode, both RAMP1 and RAMP2 cross VE2 at different times in the switching cycle. As a result, the switching cycle is composed of three portions and each PWM control signal changes state at least once during each switching cycle. In this mode PWM1 has a high value for T1 and T2 and a low value for T3 as indicated by the PWM1 waveform in FIG. 10B. Synchronous rectifier switch remains OFF for T1 and T2 and ON for T3. PWM2 has a high value for T1 and a low value for T2 and T3. Thus, capacitor drain switch 101 is ON for T1 and OFF for T2 and T3. PWM3 has a low value for T1, a high value for T2, and a low value for T3. Thus, main switch 105 and capacitor charging switch 102 are OFF for T1, ON for T2, and OFF for T3 as illustrated in FIG. 10B. Thus, during portion T1 of the switching cycle, energy in the buck-boost capacitor is drained through inductor 109. Then, during T2, energy flows through main switch 105 to both the buck-boost capacitor 107 and inductor 109 such that buck-boost capacitor 107 may be charged to a voltage less than or equal to input voltage 111. Then, during T3, energy flows out of inductor 109 while energy in the buck-boost capacitor 107 is largely retained. In other examples of the combination mode, during T2, capacitor charging switch 102 may be ON or partially ON for a portion of T2. In certain other examples, either or both the T1 and T3 portions of the switching cycle of the combination mode may be zero.

Figure 12:
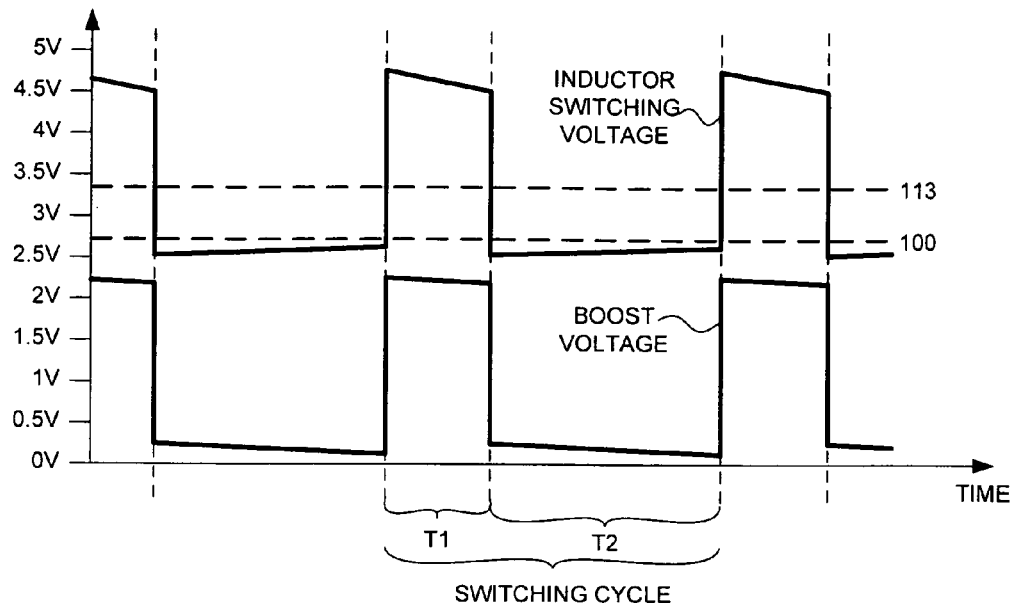
FIG. 12 is a diagram illustrative of the inductor switching voltage and boost voltage of the second embodiment of a novel power converter in a buck-optimized topology operating in the step-down mode of FIG. 10A.
Figure 13:
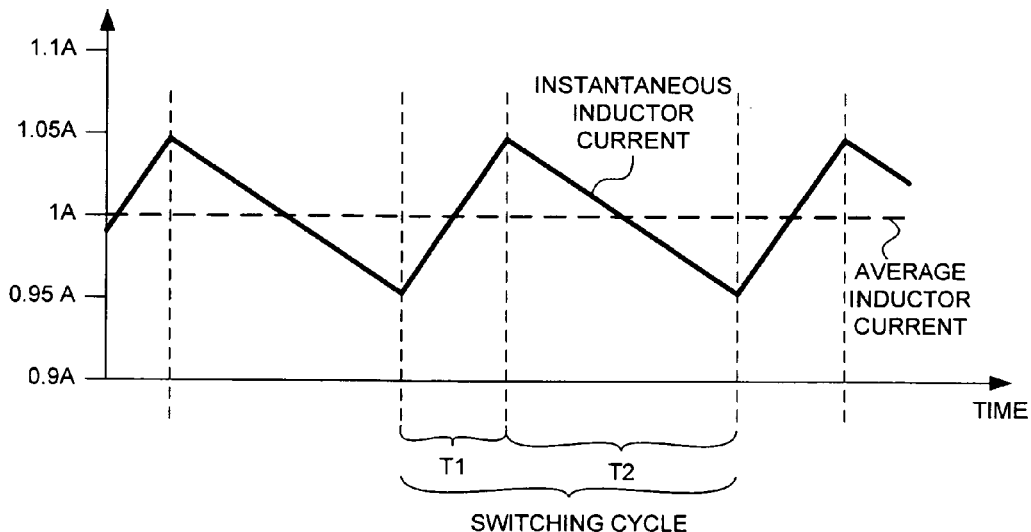
FIG. 13 is a diagram illustrative of the instantaneous inductor current of the second embodiment of a novel power converter in a buck-optimized topology operating in the step-down mode of FIG. 10A.

FIG. 10C illustrates a step-up mode of operation exhibited in this example when VE2 is +1.25 volts. Throughout the switching cycle illustrated in FIG. 10C, signal RAMP1, although it is ramping up and then returning back down, is always less than VE2. Comparator 32 therefore always outputs PWM1 to have a high value due to the way that the inputs of comparator 32 are connected. This is indicated by the PWM1 waveform in FIG. 10A. Thus, in this step-up mode, synchronous rectifier switch 106 is always OFF. The RAMP2 signal, however, crosses VE2 as indicated in FIG. 10C. When RAMP2 is lower than VE2 for a portion of a switching cycle T1, then comparator 33 outputs PWM2 to have a high value due to the way that the inputs of comparator 33 are connected. When RAMP2 is higher than VE2 for a portion of a switching cycle T2, then comparator 33 outputs PWM2 to have a low value. This is indicated by the PWM2 waveform in FIG. 10C. Therefore, capacitor drain switch 101 is ON for T1 and OFF for T3. PWM1 and the inverse of PWM2 are received by the logical AND functional circuit, which outputs PWM3 to have a low value for T1 and a high value for T2. Therefore, main switch 105 and capacitor charging switch 102 are OFF for T1 and ON for T2. Thus, during portion T1 of the switching cycle, energy in the buck-boost capacitor is drained into inductor 109. FIG. 12 illustrates the boost voltage signal present on boost terminal 122 and the inductor switching voltage signal present on inductor terminal 123 during the switching cycle. At the point where the capacitor drain switch 101 is closed at the beginning of T1 both the boost voltage and the inductor switching voltage are driven up as capacitor node 119 is coupled to input voltage source 100 of power converter 180. This results in a corresponding increase in the instantaneous current flowing through inductor 109 as illustrated in FIG. 13 as the buck-boost capacitor 107 discharges into inductor 109. Then during T2 energy flows through main switch 105 to inductor 109 and to recharge the buck-boost capacitor. FIG. 12 illustrates the drop-off in the boost voltage as a result of opening capacitor drain switch 101 and closing capacitor charging switch 102 and the corresponding drop in inductor switching voltage. During T2, the buck-boost capacitor 107 is charged to a voltage less than or equal to input voltage 100. Meanwhile, the instantaneous inductor current flow continues, but at a diminishing rate as illustrated in FIG. 13. This mode operates to step-up the output voltage above the input voltage by both supplying energy to inductor 109 directly through main switch 105 and indirectly by charging buck-boost capacitor 107 and discharging buck-boost capacitor 107 to inductor 109. FIG. 12 illustrates that output voltage 113, which approximates the average of the inductor switching voltage over time, exceeds input voltage 100 because of the step-up in inductor switching voltage during T1. By changing the relative magnitudes of T1 and T2, main switch 105, capacitor charging switch 102, and capacitor drain switch 101 are made to switch such that the amount of energy stored in inductor 109 per switching cycle is such that VOUT is regulated to the desired value as determined by VREF. In other embodiments of the step-up mode, during T2, capacitor charging switch 102 may be ON or partially ON for a portion of T2.

In another embodiment of switch controller 112, power converter 180 may be programmed to operate in only a step-up mode and a step-down mode.

For descriptive purposes, the states of switching elements in the various embodiments described in this specification have been referred to as ON or OFF, or alternatively, closed or open. However, equivalent functionality to an OFF state, or an open state, may be achieved when switching elements are not substantially conductive. Thus, a switching element is considered substantially not conductive when conducting an average of less than five percent of the output current.

Although the operation of the second embodiment of power converter 180 in accordance with the switch controller 112 of FIG. 8 operating in an average current control mode is described above in detail, other control modes may be employed. For example, the integrating current error amplifier circuit 9 could be removed and error signal VE1 may be transmitted directly to comparators 32 and 33. However, when using this type of voltage control, a rapid change in the input voltage may cause VOUT to momentarily change. Inductor current during the switching cycle during which the increased input voltage is experienced is increased, thereby causing VOUT to be affected before the voltage control loop reacts, corrects for the increased input voltage, and causes VOUT to return to its desired value. In the average current control mode of FIG. 8, on the other hand, a rapid increase in input voltage is reflected in VCS during that switching cycle, and in response, the duty cycle is automatically adjusted. The resulting change in inductor current is much more rapid, and may occur during the same switching cycle as the input variation, resulting in no change in VOUT.

Although the average current control mode is explained above in connection with an embodiment in which the pulse width modulation circuit 10 operates by generating two ramp signals, other circuits for generating the desired PWM1, PWM2, and PWM3 signals may be employed. In one example, a single ramp signal is generated and a programmable offset voltage is added to the second error voltage VE2 as it is supplied to one of the comparators 32 and 33. Other offset voltage to VOUT-VIN functions can be employed other than, or in addition to, the particular exemplary function set forth above.

Figure 14:
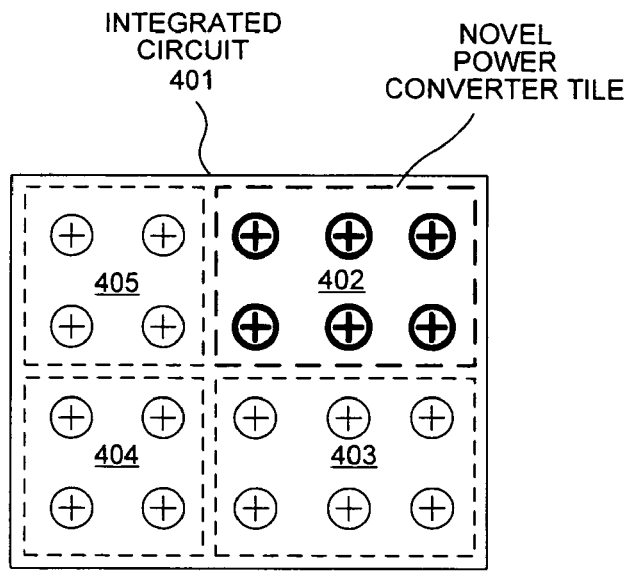
FIG. 14 is a diagram of a novel Chip Scale Package (CSP) integrated circuit. The CSP integrated circuit includes a novel power converter tile as well as other tiles.

FIG. 14 is a diagram involving a Chip Scale Package (CSP) integrated circuit 401 in accordance with another novel aspect. The novel power converter 180 of FIGS. 2, 3, 5, or 6 may be embodied in the form of a power converter tile 402. Four tiles 402-405 make up integrated circuit 401. The novel power converter tile 402 can be combined with numerous other types of tiles at the integrated circuit design stage to realize a custom application specific CSP integrated circuit.

For additional detail on the tile architecture, and how the tiles interconnect and intercommunicate, and how the tiles can be programmably configured, see: 1), U.S. patent application Ser. No. 11/978,458, entitled "Microbump Function Assignment In A Buck Converter", filed Oct. 29, 2007, by Huynh et al.; 2) U.S. patent application Ser. No. 11/544,876, entitled "Method and System for the Modular Design and Layout of Integrated Circuits", filed Oct. 7, 2006, by Huynh et al.; 3) U.S. provisional application 60/850,359, entitled "Single-Poly EEPROM Structure For Bit-Wise Write/Overwrite", filed Oct. 7, 2006; 4) U.S. patent application Ser. No. 11/888,441, entitled "Memory Structure Capable of Bit-Wise Write or Overwrite", filed Jul. 31, 2007, by Grant et al.; and 5) U.S. patent application Ser. No. 11/978,319, entitled "Interconnect Layer of a Modularly Designed Analog Integrated Circuit", filed Oct. 29, 2007, by Huynh et al. (the subject matter of each of these patent documents is incorporated herein in its entirety).

Figure 15:
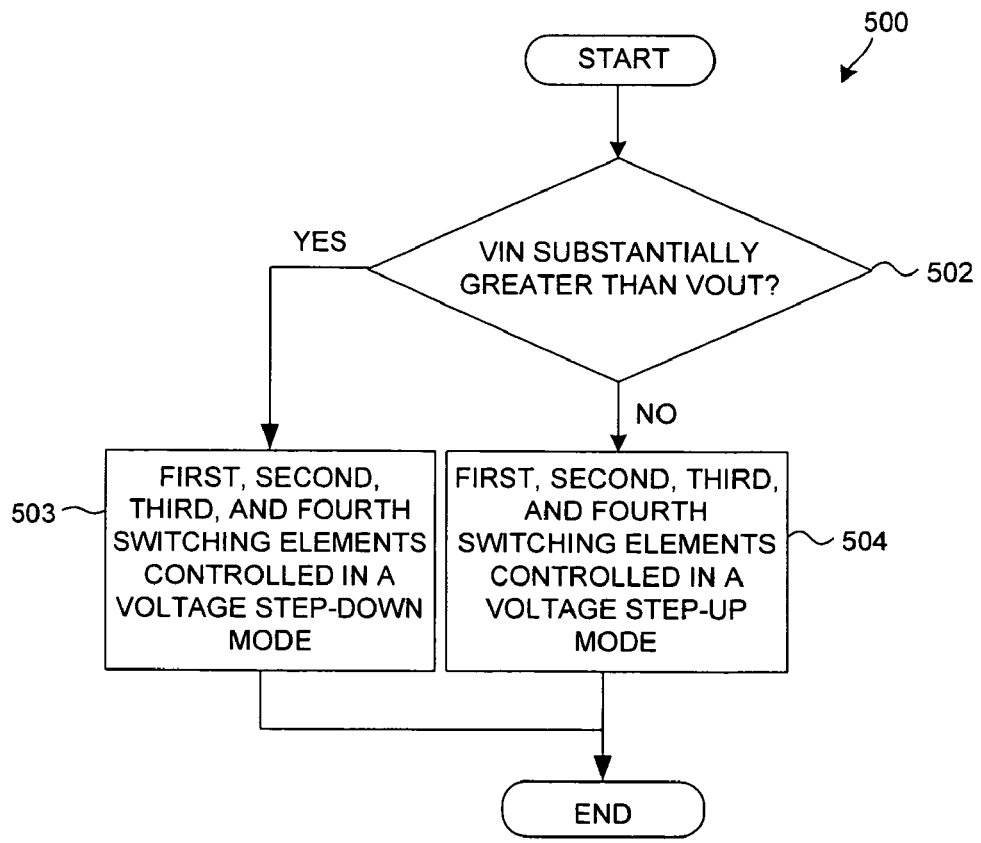
FIG. 15 is a flowchart indicative of a method of controlling a first, second, third, and fourth switching elements in a step-up mode or a step-down mode.

FIG. 15 is a flowchart of a method 500. A determination is made if an input voltage of a power converter is substantially greater than an output voltage of the power converter 502. If the input voltage is substantially greater than the output voltage then the first, second, third, and fourth switching elements are controlled in a voltage step-down mode 503. If the input voltage is substantially less than the output voltage then the first, second, third, and fourth switching elements are controlled in a voltage step-up mode 504.

Although the novel power converter 180 is explained above in connection with several embodiments of a single input voltage 111 and a single output voltage 113, other multiphase topologies may be realized utilizing novel power converter 180 as an element. The waveform diagrams set forth above are simplifications. For more accurate waveforms, the actual circuit to be realized can be simulated using a circuit simulator (for example, SPICE) that outputs waveform diagrams. Accordingly, various modifications, adaptations, and combinations of various features of the described embodiments can be practiced without departing from the scope of the invention as set forth in the claims.

What is claimed is:

1. An apparatus comprising:
a first switching element coupled between a first Direct Current (DC) voltage node and a first switching node;
a second switching element coupled between a second DC voltage node and the first switching node;
a third switching element coupled between a third DC voltage node and a second switching node;
a fourth switching element coupled between a fourth DC voltage node and the second switching node; and
a switch controller that controls at least two of the first, second, third, and fourth switching elements, wherein the apparatus is operable to receive at least one input voltage and to deliver at least one output voltage, wherein the apparatus is operable in a voltage step-up mode, wherein the apparatus can supply an output voltage that is higher than an input voltage, and a voltage step-down mode, wherein the apparatus can supply an output voltage that is lower than the input voltage, and wherein during at least one operating mode an output current flowing through the first switching node flows through no more than one of the first, second, third and fourth switches at a given time.

2. The apparatus of claim 1, wherein the first switching node is adapted to couple to a capacitor and the second switching node is adapted to couple to the capacitor.

3. The apparatus of claim 1, wherein the first switching node is a terminal.

4. The apparatus of claim 1, wherein the apparatus is an integrated circuit.

5. The apparatus of claim 1, wherein the first, second, third, and fourth switching elements are selected from a group consisting of a diode and a transistor.

6. The apparatus of claim 1, wherein the output voltage is regulated.

7. The apparatus of claim 1, wherein the switch controller comprises:
a ramp generator circuit that outputs at least one ramp signal.

8. The apparatus of claim 1, wherein the switch contoller comprises:
at least one error amplifier circuit.

9. The apparatus of claim 1, wherein the switch controller comprises:
at least one current sense signal.

10. The apparatus of claim 1, wherein the switch controller comprises:
an integrating voltage error amplifier circuit that compares an output voltage (VOUT) to a reference voltage (VREF) and that outputs a first error signal;
an integrating current error amplifier circuit that integrates the difference between a current sense signal and the first error signal and outputs a second error signal, wherein the current sense signal is indicative of a magnitude of a current flow through at least one switching element; and
a pulse width modulation circuit that receives the second error signal and generates at least one control signal.

11. The apparatus of claim 10, wherein the pulse width modulation circuit comprises:
a ramp generator circuit that outputs a first ramp signal and a second ramp signal, wherein the second ramp signal is offset from the first ramp signal by an offset voltage;
a first comparator that compares the first ramp signal with the second error signal and outputs a first control signal;
a second comparator that compares the second ramp signal with the second error signal and outputs a second control signal; and
a logical AND functional circuit that receives the first control signal and the inverse of the second control signal and outputs a third control signal.

12. An apparatus comprising:
a first switching element coupled between a first DC voltage node and a first switching node;
a second switching element coupled between a second DC voltage node and the first switching node;
a third switching element coupled between the first DC voltage node and a second switching node;
a fourth switching element coupled between the second DC voltage node and the second switching node; and
a switch controller that controls at least two of the first, second, third, and fourth switching elements, wherein the apparatus is operable in a voltage step-up mode, wherein the apparatus can supply an output voltage that is higher than an input voltage, and a voltage step-down mode, wherein the apparatus can supply an output voltage that is lower than the input voltage, and wherein the third and fourth switching elements are substantially not conductive in the voltage step-down mode.

13. The apparatus of claim 12, further comprising:
a capacitor coupled between the first switching node and the second switching node;
an input voltage (VIN) present on the first DC voltage node;
a return voltage (VRET) present on the second DC voltage node;
an output voltage (VOUT) present on an output voltage node; and
an inductor coupled between the first switching node and the output voltage node.

14. The apparatus of claim 12, wherein during the voltage step-up mode the fourth switching element is ON for a portion of a switching cycle.

15. An apparatus comprising:
a first switching element coupled between a first DC voltage node and a first switching node;
a second switching element coupled between a second DC voltage node and the first switching node;
a third switching element coupled between the first DC voltage node and a second switching node;
a fourth switching element coupled between the second DC voltage node and the second switching node; and
a switch controller that controls at least two of the first, second, third, and fourth switching elements, wherein the apparatus is operable in a voltage step-up mode, wherein the apparatus can supply an output voltage that is higher than an input voltage, and a voltage step-down mode, wherein the apparatus can supply an output voltage that is lower than the input voltage, and wherein the third and fourth switching elements are substantially not conductive in the voltage step-up mode.

16. The apparatus of claim 15, further comprising:
a capacitor coupled between the first switching node and the second switching node;
an output voltage (VOUT) present on the first DC voltage node;
a return voltage (VRET) present on the second DC voltage node; and
an inductor coupled between the first switching node and an input voltage node, wherein an input voltage (VIN) is present on the input voltage node.

17. The apparatus of claim 15, wherein during the voltage step-down mode the fourth switching element is ON for a portion of a switching cycle.

18. A method comprising:
controlling at least two of a first switching element, a second switching element, a third switching element, and a fourth switching element of a power converter,
wherein if an input voltage (VIN) of the power converter is substantially greater than an output voltage (VOUT) of the power converter then the first, second, third, and fourth switching elements are controlled such that the power converter operates in a voltage step-down mode,
wherein if VIN is substantially less than VOUT then the first, second, third, and fourth switch elements are controlled such that the power converter operates in a voltage step-up mode, and
wherein an output current of the power converter flows through the first switching element while the second, third, and fourth switching elements are substantially not conductive.

19. The method of claim 18, further comprising:
generating a first ramp signal and a second ramp signal, wherein the second ramp signal is offset from the first ramp signal by an offset voltage, and wherein the offset voltage is a function of VIN and VOUT.

20. The method of claim 18, further comprising:
integrating a difference between an error signal and a current sense signal to generate a second error signal, wherein the current sense signal is indicative of the output current.

21. The method of claim 18, wherein during the voltage step-up mode the fourth switching element is ON for at least a portion of a switching cycle and during the voltage step-down mode the third switch is substantially not conductive.

22. The method of claim 18, wherein during the voltage step-down mode the fourth switching element is ON for at least a portion of a switching cycle and during the voltage step-up mode the third switch is substantially not conductive.

23. An integrated circuit comprising:
a first switching element coupled between a first DC voltage node and a first switching node;
a second switching element coupled between a second DC voltage node and the first switching node;
a third switching element coupled between a third DC voltage node and a second switching node;

a fourth switching element coupled between a fourth DC voltage node and the second switching node; and means for controlling at least two of the first, second, third, and fourth switching elements such that the first, second, third, and fourth switches are operable in a voltage step-up mode, wherein the integrated circuit can supply an output voltage that is higher than an input voltage, and a voltage step-down mode, wherein the integrated circuit can supply an output voltage that is lower than the input voltage, wherein during at least one operating mode an output current flows through only one switch, and wherein the means does not extend outside the integrated circuit.

24. The integrated circuit of claim 23, wherein the means is also for controlling at least two of the first, second, third, and fourth switch elements such that the first, second, third, and fourth switching elements are operable in an average current control mode.

25. An apparatus comprising:
  a first switching element coupled between a first DC voltage node and a first switching node;
  a second switching element coupled between a second DC voltage node and the first switching node;
  a third switching element coupled between a third DC voltage node and a second switching node;
  a fourth switching element coupled between a fourth DC voltage node and the second switching node;
  a capacitor coupled between the first switching node and the second switching node;
  an inductor coupled to the first switching node; and
  wherein the apparatus is operable to receive at least one input voltage and to deliver at least one output voltage.

26. The apparatus of claim 25, wherein an energy quantity is transferred between the capacitor and the inductor during a first part of a switching cycle.

27. The apparatus of claim 26, wherein an energy quantity is transferred between the capacitor and the fourth DC voltage node during a second part of the switching cycle.

28. The apparatus of claim 26, wherein an energy quantity is transferred between the inductor and the first DC voltage node during a second part of a switching cycle.

29. The apparatus of claim 25, wherein the inductor is coupled to an output voltage node and an energy in the inductor increases when the third switching element is ON.

30. The apparatus of claim 29, wherein the apparatus is operable to generate higher voltage at the output voltage node than at the first DC voltage node.

31. The apparatus of claim 25, wherein the inductor is coupled to an input voltage node and an energy through the inductor decreases when the third switching element is ON.

32. The apparatus of claim 31, wherein the apparatus is operable to generate lower voltage at the output voltage node than at the first DC voltage node.

33. An apparatus comprising:
  a first switch coupled between a first direct current (DC) voltage node and a first switching node;
  a second switch coupled between the first switching node and a second DC voltage node;
  a third switch coupled between the first DC voltage node and a second switching node;
  a fourth switch coupled between the second switching node and the second DC voltage node; and
  a switch controller that controls at least two of the first, second, third, and fourth switches, wherein the apparatus is operable in a voltage step-down mode and a voltage step-up mode, and wherein during operation in the voltage step-down mode an output current flowing through the first switching node flows through no more than one of the first, second, third and fourth switches at a given time.

34. The apparatus of claim 33, wherein the apparatus is an integrated circuit, wherein the first switching node includes a first terminal, wherein the second switching node includes a second terminal, wherein the output current flows out of the integrated circuit through the first terminal and then through an external inductor, and wherein a first lead of an external capacitor is coupled to the first terminal and a second lead of the external capacitor is coupled to the second terminal.

* * * * *